Figure 1:
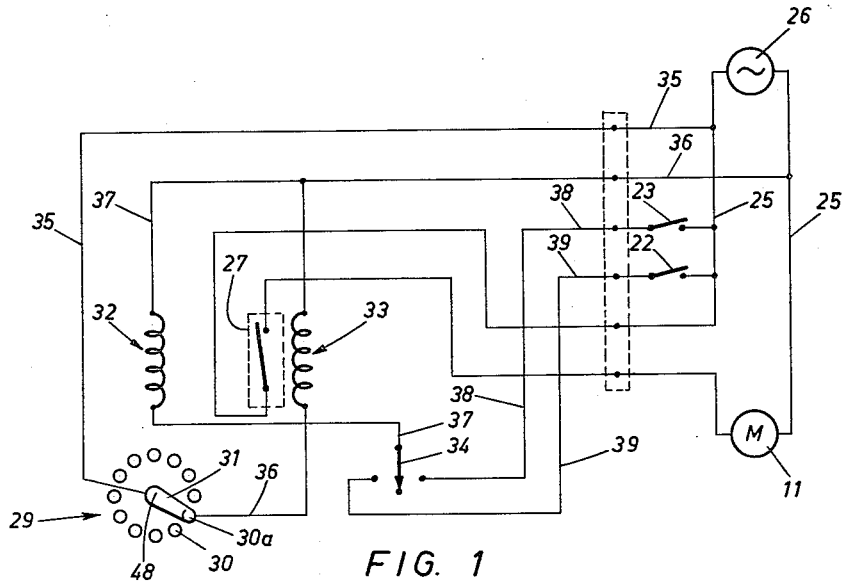

Feb. 25, 1964 D. W. GRANT 3,122,271
PRESELECTING AND CONTROL APPARATUS FOR DISPENSING DEVICES
Filed Aug. 6, 1962 2 Sheets-Sheet 1

Donald Wilson Grant
Inventor by: *[signature]*
Agent

Feb. 25, 1964 D. W. GRANT 3,122,271
PRESELECTING AND CONTROL APPARATUS FOR DISPENSING DEVICES
Filed Aug. 6, 1962 2 Sheets-Sheet 2

Donald Wilson Grant
Inventor by:
Agent

United States Patent Office 3,122,271
Patented Feb. 25, 1964

3,122,271
PRESELECTING AND CONTROL APPARATUS
FOR DISPENSING DEVICES
Donald W. Grant, Woodbridge, Ontario, Canada, assignor to Wilgrant Automatics Limited, London, Ontario, Canada
Filed Aug. 6, 1962, Ser. No. 214,976
7 Claims. (Cl. 222—17)

This invention relates to preselecting and control apparatuses used in combination with a dispensing device for dispensing a substance and which permit delivery of a predetermined amount of the substance being dispensed by the dispensing device. More particularly, this invention relates to preselecting and control apparatuses especially suited for use in connection with gasoline dispensing devices to permit customers to preselect a predetermined amount, either in gallons or dollars, of gasoline to be dispensed.

In connection with the dispensing of gasoline at service stations, it is well known that it is necessary for the customer to indicate to the service station attendant the amount of gasoline, either in dollars or gallons, which the customer requires. The service station attendant, after receiving this information, operates the gasoline dispensing device to dispense the amount of gasoline requested by the customer into the customer's automobile. It often happens that the service station attendant inadvertently will put more gasoline into the customer's car than requested by the customer, and in many such cases the customer will refuse to pay for the addition amount of gasoline. This results in a financial loss to the service station and a certain amount of ill-will.

Accordingly, it is an object of my invention to provide preselecting and control apparatus which permits the customer to preselect the amount of gasoline or other substance being dispensed and which shuts off the dispensing means when a predetermined amount of the substance has been dispensed.

In accordance with my invention I provide, in combination with dispensing means for dispensing a substance, and measuring means for measuring the quantity and cost of the substance being dispensed, preselecting and control means for permitting delivery of a predetermined amount of the substance being dispensed by the dispensing means. The measuring means include two sets of movable indicia, one of the sets being adapted to indicate the quantity of the substance being dispensed, and the other of the sets being adapted to indicate the cost of the substance being dispensed. The preselecting and control means may comprise means for inactivating the dispensing means and a stepping switch having a first movable contact, a plurality of fixed contacts each adapted to electrically contact the first movable contact during movement thereof, first means for moving the first movable contact and first actuating means for actuating the means for moving the first movable contact. Second actuating means are provided for actuating the means for inactivating the dispensing means. Means electrically connect the first movable contact and one of the fixed contacts to a source of electrical energy through the second actuating means. Two impulse switches are provided. Means are carried by one set of indicia for actuating one of the impulse switches during movement of the one set of indicia, while means are carried by the other set of indicia for actuating the other of the impulse switches during movement of the other set of indicia. A two-position switch is provided. Means electrically connect the first actuating means and one impulse switch in series with a source of electrically energy when the two-position switch is in one position, the first actuating means and the other impulse switch being connected in series with a source of electrical energy in the other position of the two-position switch.

Figure 2:
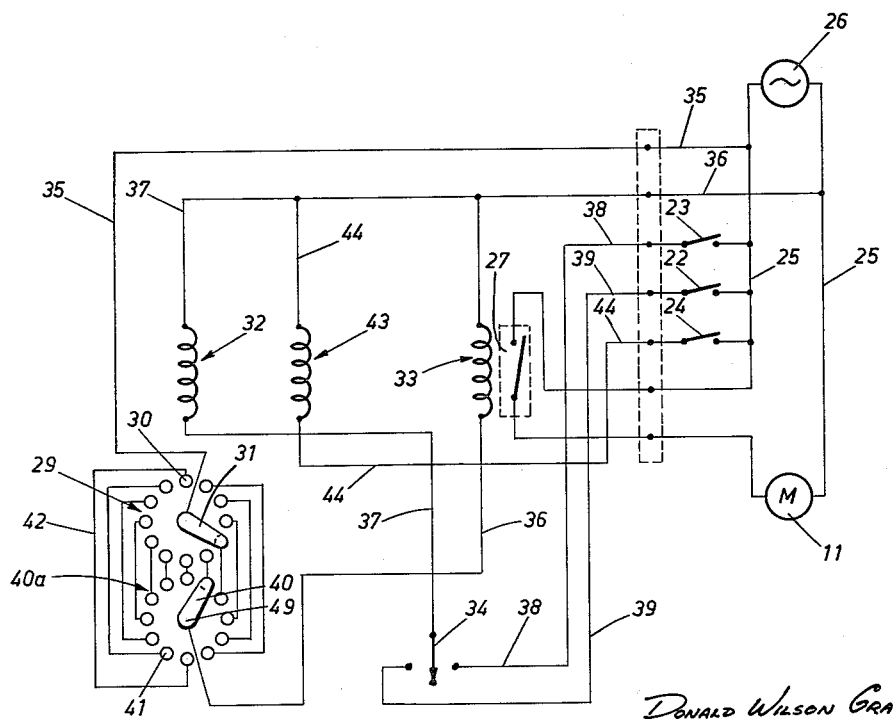
Figure 3:
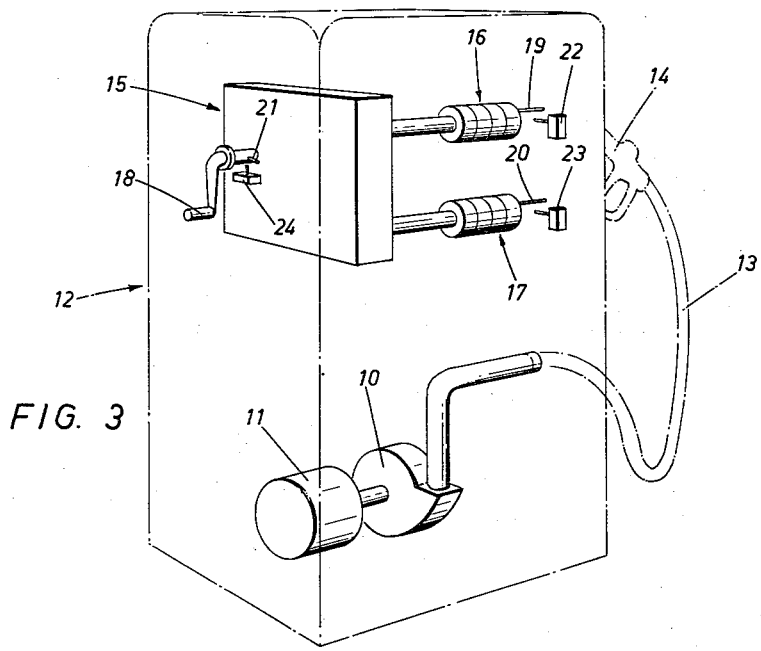
Figure 4:
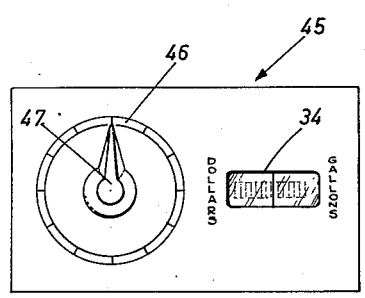
Figure 5:
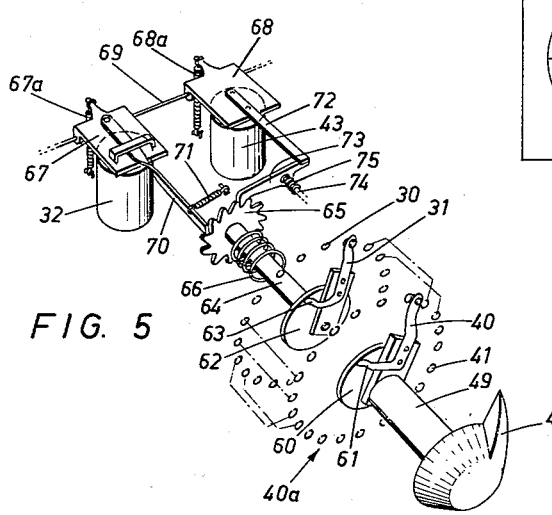

My invention will become more apparent from the following detailed description taken in conjunction with the appended drawings in which:

FIGURE 1 is a wiring diagram of one type of preselecting and control device embodying my invention, FIGURE 2 is a wiring diagram of an alternative embodiment of my invention, FIGURE 3 is a schematic representation of gasoline dispensing means, FIGURE 4 is a view showing a housing for preselecting and control apparatus embodying my invention, and FIGURE 5 is a somewhat schematic representation of a stepping switch useful in practising my invention.

Referring first to FIGURE 3, I have shown conventional gasoline dispensing apparatus of the type which may be found at any service station and which includes a pump 10 driven by an electric motor 11, both of which are positioned in a housing 12, the inlet or suction side of the pump being connected through a pipe (not shown) to an underground container (not shown) containing gasoline. Connected to the outlet or discharge side of pump 10 is a rubber hose 13 which in turn is connected to a gasoline dispensing nozzle 14. Provided in housing 12 are conventional measuring means 15 for measuring the quantity and cost of the gasoline being dispensed. The measuring means include two sets 16 and 17 of conventional movable indicia, set 16 being adapted to indicate the quantity in gallons of gasoline being dispensed, and set 17 being adapted to indicate the cost of the substance being dispensed. Conventional means for resetting movable indicia 16 and 17 to zero and including a crank handle 18 extending outwardly of housing 12 are provided. Each set of movable indicia 16 and 17 is provided with actuating means in the form of fingers 19 and 20 respectively connected thereto and rotatable therewith. Crank handle 18 also is provided with actuating means in the form of a finger 21 connected thereto and rotatable therewith. Three impulse switches 22, 23 and 24 are suitably mounted in housing 12. Impulse switches 22 to 24 inclusive are positioned so as to be actuated by fingers 19 to 21 respectively during rotation of sets of indicia 16 and 17 and crank handle 18 respectively.

Referring now to FIGURE 1, it will be seen that pump motor 11 is connected by conductors 25 to a suitable source of electrical energy such as an A.C. generator 26, pump motor 11 being connected to generator 26 through a switch 27 which is arranged in such a manner that it can only close when gasoline dispensing nozzle 14 has been removed from housing 12. Switch 27 constitutes means for inactivating pump motor 11 and hence the whole gasoline dispensing apparatus. Switch 27 actually constitutes the contacts of a relay, which relay has a coil 33. A stepping switch 29 having a plurality of fixed contacts 30 and a movable contact 31 is provided. Stepping switch 29 has a coil 32 which serves as actuating means for actuating the means which are employed to rotate movable contact 31, these latter means being shown in FIGURE 5 and being described in detail hereafter. A two-position switch 34 is provided. Movable contact 31 and one fixed contact 30a are electrically connected to A.C. generator 26 by conductors 35 and 36, movable contact 31 and fixed contact 30a being connected to A.C. generator 26 through coil 33. Coil 32 and impulse switch 23 are connected in series to A.C. generator 26 through two-position switch 34, when the later is in its right-hand position, by conductors 37 and 38. Coil 32 and impulse switch 22 are connected in series to A.C. generator 26 through two-position switch 34, when the latter is in its left-hand position, by conductors 37 and 39.

Turning now to FIGURE 2, pump motor 11 is connected to an A.C. generator 26 via conductors 25 and through a switch 27 which, as in the case of FIGURE 1, is conventionally actuated to a closed position upon removal of dispensing nozzle 14 from housing 12. As in the case of FIGURE 1, switch 27 is actually the contacts of a relay, the coil of which is numbered 33. As in the case of FIGURE 1, a two-position switch 34 is provided along with a coil 32 which constitutes actuating means for actuating the means which move the movable contact 31 of a stepping switch 29 which also has fixed contacts 30. Associated with stepping switch 29 is another switch 40a having a movable contact 40 and a plurality of fixed contacts 41 each of which are adapted to electrically contact movable contact 40 during rotation thereof. As shown in FIGURE 2, fixed contacts 30 and 41 are connected by conductors 42. A reset coil 43 which forms part of the means for resetting stepping switch 29 is provided. Movable contacts 31 and 40 are connected by conductors 35 and 36 and through coil 33 to A.C. generator 26. Coil 32 in the right-hand position of two-position switch 34 is connected by conductors 37 and 38 through impulse switch 23 to A.C. generator 26. Coil 32 in the left-hand position of two-position switch 34 is connected through conductors 37 and 39 and impulse switch 22 to A.C. generator 26. Reset coil 43 is connected through impulse switch 24 and by conductors 44 to A.C. generator 26.

In FIGURE 4 I have shown a housing 45 wherein all the components of my preselecting and control device, with the exception of impulse switches 22 to 24 and switch 27 are located. Mounted on housing 45 is a dial 46 which is calibrated in both dollars and gallons. A pointer or selector 47 is provided. In the embodiment of my invention shown in FIGURE 1, pointer 47 is coupled to shaft 48 of movable contact 31. In the case of the embodiment of my invention shown in FIGURE 2, pointer 47 is coupled to the shaft 49 of movable contact 40. Two-position switch 34 is shown in FIGURE 4.

In FIGURE 5 I have shown schematically stepping switch 29 and switch 40a of FIGURE 2. Switch 40a has fixed contacts 41 mounted in a board (not shown) of insulating material and a movable contact 40 which wipes fixed contacts 41. Movable contact 40 is carried on shaft 49 fastened to pointer 47. Also carried on and fixed to the insulating board is a collector disc 60 against which a wiper arm 61 connected to contact 40 brushes. Disc 60 is connected to conductor 36 (FIGURE 2).

Stepping switch 29 has fixed contacts 30 mounted on an insulating board (not shown) to which is secured a collector disc 62. Collector disc 62 is connected to conductor 35 (FIGURE 2). Movable contact 31 which wipes against contacts 30 is carried, along with a wiper arm 63 connected thereto, on a shaft 64 to which is secured a sprocket 65. A spring 66 acting like the mainspring of a watch surrounds shaft 64 and has one end secured thereto. Some of conductors 42 connecting contacts 30 and 41 are shown. Above each of coils 32 and 43 are iron plates 67 and 68 respectively, each being pivotably mounted on a rod 69. Plate 67 carries a finger 70 which is biased by a spring 71 and which engages sprocket 65. Plate 68 also carries a finger 72 which engages a latch member 73 pivotably mounted on a rod 74 and biased to a sprocket engaging position by a spring 75. Plates 67 and 68 are normally maintained in their up position (that shown in FIGURE 5) by springs 67a and 68a.

Each time coil 32 is energized, plate 67 and finger 70 are drawn downwardly causing sprocket 65, shaft 64 and contact 31 to rotate a distance sufficient to move contact 31 from one contact 30 to the next. This movement winds spring 66, but sprocket 65 cannot counter-rotate because of latch member 73. When coil 43 is energized, plate 68 and finger 72 are moved downwardly, thereby releasing latch member 73. This permits contact 31 to return to its normal position as a result of the unwinding of spring 66. Of course, a stop (not shown) for contact 31 at its normal position is provided.

Stepping switch 29 of FIGURE 1 is the same as that shown in FIGURE 5 except that the following elements are deleted: spring 66, latch member 73, rod 74, spring 75, finger 72, plate 68, spring 68a and coil 43. Of course, no switch 40a or conductors 42 are provided, and pointer 47 is connected to shaft 64. One of the fixed contacts (30a in FIGURE 1) is connected to conductor 36.

In the operation of the embodiment of my invention shown in FIGURE 1, the customer operates two-position switch 34 to select either dollars or gallons, and then moves pointer 47 to the appropriate place on dial 46 to select a predetermined amount, in dollars or gallons, of gasoline. This in turn moves movable contact 31 from the position shown in FIGURE 1 until it contacts one of fixed contacts 30. After this has been done, nozzle 14 inserted in the gasoline tank of the car, and crank handle 18 turned to reset indicia 16 and 17, the service station attendant begins to dispense gasoline by actuating the lever (not shown) of gasoline nozzle 14. As gasoline is dispensed, indicia 16 and 17 rotate and, by virtue of their fingers 19 and 20, cause impulse switches 22 and 23 to close once during each revolution of indicia 16 and 17. It will be assumed that two-position switch 34 is in the left-hand position thereof, which means that the customer has selected a certain number of gallons to be delivered. Consequently, every time impulse switch 22 is closed, an impulse is delivered through switch 22 and two-position switch 34 to coil 32, causing movement of movable contact 31 from one fixed contact 30 to the next adjacent fixed contact 30 in the manner hereinbefore described. When movable contact 31 rotates to the position shown in FIGURE 1, wherein it contacts fixed contact 30a, a circuit is completed through fixed contact 30a and movable contact 31 to A.C. generator 26 through relay coil 33. This causes opening of contacts 27 which in turn interrupts the supply of electrical energy to pump motor 11 and causes the gasoline being dispensed through nozzle 14 to cease flowing. Had two-position switch 34 been in the right-hand position thereof, the same process would have been followed except that impulses to coil 32 would have been delivered to this coil through impulse switch 23 activated by finger 20. It will be seen that with the embodiment of my invention shown in FIGURE 1 there is no necessity to reset stepping switch 29, as the position of movable contact 31 shown in FIGURE 1 corresponds to pointer 47 being opposite zero on dial 46.

When the next customer rotates contact 31, coil 33 is deenergized. This permits switch 27 to close upon removal of nozzle 14 from housing 12.

In the embodiment of my invention shown in FIGURE 2 the same procedure as hereinbefore described is followed, and movable contact 40 is set on one of fixed contacts 41 by virtue of rotation of pointer 47 to the desired position on dial 46. Depending upon whether switch 34 is in the left or right-hand positions, impulses are delivered to coil 32 through impulse switches 22 or 23 respectively, causing movement of movable contact 31, in the manner hereinbefore described, from one fixed contact 30 to the adjacent fixed contact. When movable contact 31 has moved into contact with a fixed contact 30 connected through a conductor 42 to the fixed contact 41 on which movable contact 40 is set, a circuit is completed from A.C. generator 26 through conductor 35, movable contact 31, conductor 42, movable contact 40, conductor 36 and coil 33. Energization of coil 33 results in the opening of contacts 27 which in turn interrupts the supply of electrical energy to pump motor 11 suspending dispensing of the gasoline. When crank handle 18 is turned to reset indicia 16 and 17, finger 21 contacts impulse switch 24, closing this switch and energizing coil 43, which causes resetting of movable contact 31 in the manner hereinbefore described.

Those skilled in the art will appreciate that while I have described certain embodiments of my invention, changes and modifications may be made therein without departing from the spirit and scope of my invention as defined in the appended claims.

What I claim as my invention is:

1. In combination with dispensing means for dispensing a substance and measuring means for measuring the quantity and cost of the substance being dispensed, said measuring means including two sets of movable indicia, one of said sets being adapted to indicate the quantity of the substance being dispensed and the other of said sets being adapted to indicate the cost of the substance being dispensed; the improvement which comprises preselecting and control means for permitting delivery of a predetermined amount of the substance being dispensed by said dispensing means, said preselecting and control means comprising means for inactivating said dispensing means, a stepping switch having a first movable contact, a plurality of fixed contacts each adapted to electrically contact said first movable contact during movement thereof, first means for moving said first movable contact and first actuating means for actuating said first means for moving said first movable contact, second actuating means for actuating said means for inactivating said dispensing means, means electrically connecting said first movable contact and one of said fixed contacts to a source of electrical energy through said second actuating means, two impulse switches, means carried by said one set of indicia for actuating one of said impulse switches during movement of said one set of indicia, means carried by said other set of indicia for actuating the other of said impulse switches during movement of said other set of indicia, a two-position switch, means electrically connecting said first actuating means and said one impulse switch in series with a source of electrical energy when said two-position switch is in one position, said first actuating means and said other impulse switch being connected in series with a source of electrical energy in the other position of said two-position switch.

2. The invention according to claim 1 wherein said first actuating means is a coil, said second actuating means is the coil of a relay and said means for inactivating said dispensing means are the contacts of said relay.

3. The invention according to claim 2 wherein said dispensing means includes a pump, an electric motor driving said pump; and means electrically connecting said motor to a source of electrical energy through said contacts of said relay.

4. In combination with dispensing means for dispensing a substance and measuring means for measuring the quantity and cost of the substance being dispensed, said measuring means including two sets of movable indicia, one of said sets being adapted to indicate the quantity of the substance being dispensed and the other of said sets being adapted to indicate the cost of the substance being dispensed; the improvement which comprises preselecting and control means for permitting delivery of a predetermined amount of the substance being dispensed by said dispensing means, said preselecting and control means comprising means for inactivating said dispensing means, a stepping switch having a first movable contact, a plurality of fixed contacts each adapted to electrically contact said first movable contact during movement thereof, first means for moving said first movable contact and first actuating means for actuating said first means for moving said first movable contact, second actuating means for actuating said means for inactivating said dispensing means, a second movable contact adapted to individually electrically contact said fixed contacts during movement of said second movable contact, means electrically connecting said first and second movable contacts to a source of electrical energy through said second actuating means, first and second impulse switches, means carried by said one set of indicia for actuating one of said impulse switches during movement of said one set of indicia, means carried by said other set of indicia for actuating the other of said impulse switches during movement of said other set of indicia, a two-position switch, means electrically connecting said first actuating means and said one impulse switch in series with a source of electrical energy when said two-position switch is in one position, said first actuating means and said other impulse switch being connected in series with a source of electrical energy in the other position of said two-position switch, and means for resetting said first movable contact.

5. The invention according to claim 4 wherein said dispensing means includes means for resetting said sets of indicia and wherein said means for resetting said first movable contact include a third impulse switch, a coil, means electrically connecting said coil to a source of electrical energy through said third impulse switch, and means carried by said means for resetting said sets of indicia for actuating said third impulse switch during movement of said means for resetting said sets of indicia.

6. The invention according to claim 4 wherein said first actuating means is a coil, said second actuating means is the coil of a relay and said means for inactivating said dispensing means are the contacts of said relay.

7. The invention according to claim 6 wherein said dispensing means includes a pump, an electric motor driving said pump; and means electrically connecting said motor to a source of electrical energy through said contacts of said relay.

No references cited.